United States Patent
Cai (10) Patent No.: US 12,100,842 B2
(45) Date of Patent: Sep. 24, 2024

(54) ELECTRODE PLATE, BATTERY CELL, AND ELECTROCHEMICAL DEVICE

(71) Applicant: Ningde Amperex Technology Limited, Ningde (CN)

(72) Inventor: Zhenghuang Cai, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 320 days.

(21) Appl. No.: 16/858,977

(22) Filed: Apr. 27, 2020

(65) Prior Publication Data

US 2021/0288330 A1    Sep. 16, 2021

Related U.S. Application Data

(63) Continuation-in-part of application No. PCT/CN2020/079497, filed on Mar. 16, 2020.

(51) Int. Cl.
| | |
|---|---|
| H01M 4/66 | (2006.01) |
| H01M 4/13 | (2010.01) |
| H01M 10/0525 | (2010.01) |
| H01M 50/54 | (2021.01) |

(52) U.S. Cl.
CPC ............ *H01M 4/667* (2013.01); *H01M 4/13* (2013.01); *H01M 4/661* (2013.01); *H01M 4/668* (2013.01); *H01M 10/0525* (2013.01); *H01M 50/54* (2021.01)

(58) Field of Classification Search
CPC ........ H01M 4/667; H01M 50/54; H01M 4/13; H01M 4/661; H01M 4/668; H01M 10/0525

USPC .......................................................... 429/211
See application file for complete search history.

(56) References Cited

U.S. PATENT DOCUMENTS

2020/0313148 A1    10/2020    Cai et al.
2020/0411841 A1    12/2020    Shao et al.

FOREIGN PATENT DOCUMENTS

| CN | 201117712 Y | 9/2008 | |
|---|---|---|---|
| CN | 204885269 U | 12/2015 | |
| CN | 105576191 A | 5/2016 | |
| CN | 108604660 A * | 9/2018 | ............ H01M 10/04 |
| CN | 207868269 U | 9/2018 | |

(Continued)

OTHER PUBLICATIONS

Wang (translation) (Year: 2020).*

(Continued)

*Primary Examiner* — Matthew T Martin
*Assistant Examiner* — Paul Christian St Wyrough
(74) *Attorney, Agent, or Firm* — Maier & Maier, PLLC (57) ABSTRACT

An electrode plate includes a first electrode tab, a second electrode tab, and an active material layer. The composite current collector includes a first metal layer, a second metal layer, and an insulation layer therebetween. The first electrode tab is on an edge of the first metal layer and extends beyond the insulation layer. The second electrode tab is on an edge of the second metal layer and extends beyond the insulation layer. The active material layer is disposed on the first metal layer and the second metal layer, and covers a portion of the first electrode tab on the first metal layer and a portion of the second electrode tab one the second metal layer. A battery cell and an electrochemical device including the electrode plate are also disclosed.

13 Claims, 5 Drawing Sheets

(56) References Cited

FOREIGN PATENT DOCUMENTS

| | | | |
|---|---|---|---|
| CN | 108682788 A | | 10/2018 |
| CN | 208127309 U | | 11/2018 |
| CN | 110061182 A | | 7/2019 |
| CN | 110190242 A | | 8/2019 |
| CN | 110335984 A | | 10/2019 |
| CN | 110828775 A | * | 2/2020 |
| DE | 202016008533 U1 | * | 6/2018 |
| WO | 2019239408 A1 | | 12/2019 |
| WO | WO-2020015362 A1 | * | 1/2020 ........ H01M 10/0525 |

OTHER PUBLICATIONS

Cao (translation) (Year: 2020).*
Park (translation) (Year: 2018).*
Niedlich (translation) (Year: 2018).*
Extended Search Report issued Jul. 29, 2021 in European Patent Application No. 20731776.9; 10 pgs.
Office Action issued Apr. 8, 2023, in corresponding to Chinese Application No. 202080057198.0, 17 pages.

* cited by examiner

ELECTRODE PLATE, BATTERY CELL, AND ELECTROCHEMICAL DEVICE

FIELD

The subject matter herein generally relates to energy storage devices, in particular to an electrode plate, a battery cell including the electrode plate, and an electrochemical device including the battery cell.

BACKGROUND

Lithium-ion batteries, due to their high volume and mass energy density, long cycle life, high nominal voltage, low self-discharge rate, small volume, and light weight, are widely used in consumer electronics. With the rapid development of electric vehicles and mobile devices, demand for energy density, safety, and cycle performance of such a lithium-ion battery is higher and higher.

A current collector, as an important part of the lithium-ion battery, has a function of collecting current generated by an active material of the lithium-ion battery to form a larger current for output. By applying a composite current collector, energy density is further improved, toughness and elongation become better, and process optimization in production is achieved, and energy density per unit mass and safety are enhanced. However, metal layers on both sides of the composite current collector are isolated by a middle insulation layer and cannot conduct, which affects the performance of the lithium ion battery.

SUMMARY

In view of the above problems, the present disclosure provides an electrode plate in which metal layers on both sides of a composite current collector are capable of being easily conductive between each other, a battery cell including the electrode plate, and an electrochemical device.

The present disclosure provides an electrode plate including a composite current collector, at least one first electrode tab, at least one second electrode tab, and an active material layer. The composite current collector includes a first metal layer, a second metal layer, and an insulation layer sandwiched between the first metal layer and the second metal layer. The at least one first electrode tab is disposed on an edge of the first metal layer and extends beyond the insulation layer. The at least one second electrode tab is disposed on an edge of the second metal layer corresponding to the at least one first electrode tab and extends beyond the insulation layer, an extending direction of the at least one first electrode tab is the same as an extending direction of the at least one second electrode tab. The active material layer is disposed on the first metal layer and the second metal layer, and covers a portion of the at least one first electrode tab on the first metal layer and a portion of the at least one second electrode tab on the second metal layer.

In the present disclosure, the first electrode tab can be connected to the second electrode tab by soldering to be conductive with the second electrode tab, thus the first metal layer and the second metal layer on both sides of the composite current collector are conductive between each other.

In some embodiments, the electrode plate further includes a plurality of the first electrode plate and a plurality of the second electrode tabs respectively arranged at intervals in a length direction of the electrode plate.

In some embodiments, in a thickness direction of the electrode plate, a projection of each first electrode tab overlaps with a projection of the corresponding one of the plurality of second electrode tabs.

In some embodiments, in the length direction of the electrode plate, projections of the first electrode tabs in the thickness direction of the electrode plate and projections of the second electrode tabs in the thickness direction of the electrode plate are alternating.

In some embodiments, a distance between adjacent two first electrode tabs is equal, and a distance between adjacent two second electrode tabs is equal.

In some embodiments, a distance between adjacent two first electrode tabs can increase or decrease along the length direction of the electrode plate, and a distance between adjacent two second electrode tabs correspondingly increases or decreases along the length direction of the electrode plate.

In some embodiments, in the length direction of the electrode plate, the electrode plate includes a head portion, a middle portion, and tail portion connected in order, the at least one first electrode tab is disposed on at least one of a head portion, a middle portion, and a tail portion of the first metal layer, and the at least one second electrode tab corresponds to the at least one first electrode tab to be disposed on at least one of a head portion, a middle portion, and a tail portion of the second metal layer corresponding to the at least one first electrode tab.

In some embodiments, the electrode plate includes a first end face adjacent to the head portion and a second end face adjacent to the tail portion, when the first electrode tab and the second electrode tab are both disposed on the head portion of the electrode plate, in the length direction of the electrode plate, a distance between the first end face and each of the first electrode tab and the second electrode tab is less than ⅕ of a length of the electrode plate, wherein when the first electrode tab and the second electrode tab are both on the tail portion of the electrode plate, in the length direction of the electrode plate, a distance between the second face and each of the second electrode tab and the second electrode tab is less than ⅕ of a length of the electrode plate.

In some embodiments, the insulation layer extends beyond the first metal layer and the second metal layer in a width direction of the electrode plate, sides of the first electrode tab and the second electrode tab away from the insulation layer are provided with an insulating sheet.

In some embodiments, the at least one first electrode tab is attached to a surface of the first metal layer, and the at least one second electrode tab is attached to a surface of the second metal layer.

The present disclosure further provides a battery cell including a first electrode plate, a second electrode plate, and a separator between the first electrode plate and the second electrode plate, the first electrode plate and the second electrode plate are stacked or wound to form the battery cell. The first electrode plate is any one of the above electrode plates, the at least one first electrode tab is electrically connected to the at least one second electrode tab.

In some embodiments, in a thickness direction of the battery cell, a projection of the at least one first electrode tab overlaps with a projection of the at least one second electrode tab.

The present disclosure further provides an electrochemical device including an adapter plate and the above battery cell, the at least one first electrode tab and the at least one second electrode tab are stacked to form a multi-tab structure, the multi-tab structure is connected to the adapter plate.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings and following descriptions show merely some embodiments of the present invention, and a person of ordinary skill in the art may still derive other drawings from these accompanying drawings without creative efforts.

DETAILED DESCRIPTION

Implementations of the disclosure will now be described, by way of embodiments only, with reference to the drawing. The disclosure is illustrative only, and changes may be made in the detail within the principles of the present disclosure. It will, therefore, be appreciated that the embodiments may be modified within the scope of the claims.

It is noted that, when one component is considered as "being connected to" another component, the one component may be connected directly to the other component or an intermediate component might be present simultaneously. When a component is referred to as "being disposed on" another component, the component may be disposed on the other component or an intermediate component might be present simultaneously. Unless otherwise defined, all technical terms used herein have the same meaning as commonly understood by one of ordinary skill in the art. The technical terms used herein are to provide a thorough understanding of the embodiments described herein, but are not to be considered as limiting the scope of the embodiments. The term "and/or" used herein includes any and all combinations of one or more of the associated listed items.

Figure 1:
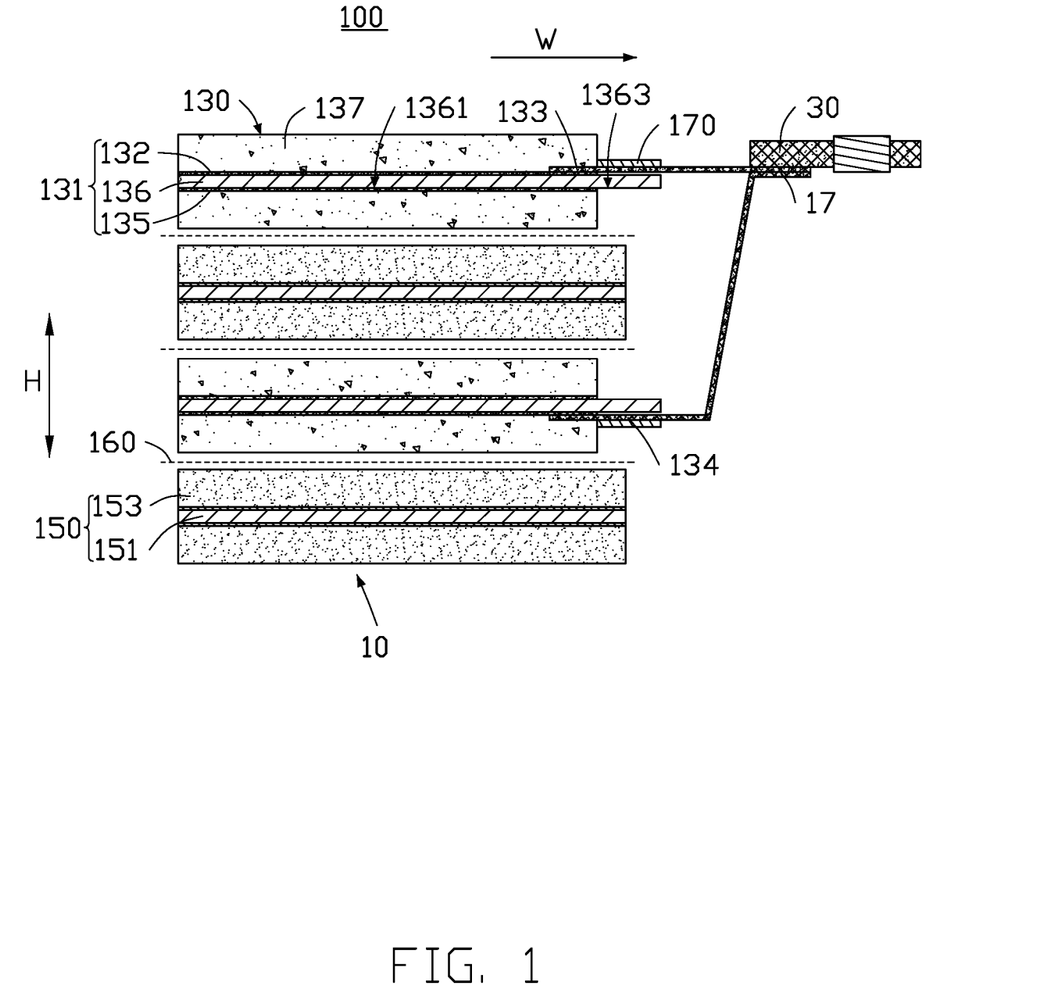
FIG. 1 is a schematic view of a first embodiment of an electrochemical device according to the present disclosure.

FIG. 1 illustrates a first embodiment of an electrochemical device 100 including a battery cell 10 and an adapter plate 30. The battery cell 10 includes a first electrode plate 130, a second electrode plate 150, and a separator 160 disposed between the first electrode plate 130 and the second electrode plate 150. The first electrode plate 130 and the second electrode plate 150 are wound or stacked to form the battery cell 10. The first electrode plate 130 includes a composite current collector 131, a first electrode tab 133 and a second electrode tab 134. The first electrode tab 133 and the second electrode tab 134 are disposed on opposite surfaces of the composite current collector 131 and located on a same side of the first electrode plate 130. The first electrode tab 133 and the second electrode tab 134 extends in a same side. The first electrode tab 133 is electrically connected to the second electrode tab 134 via the adapter plate 30 to conduct between two surfaces of the composite current collector 131.

Figure 2:
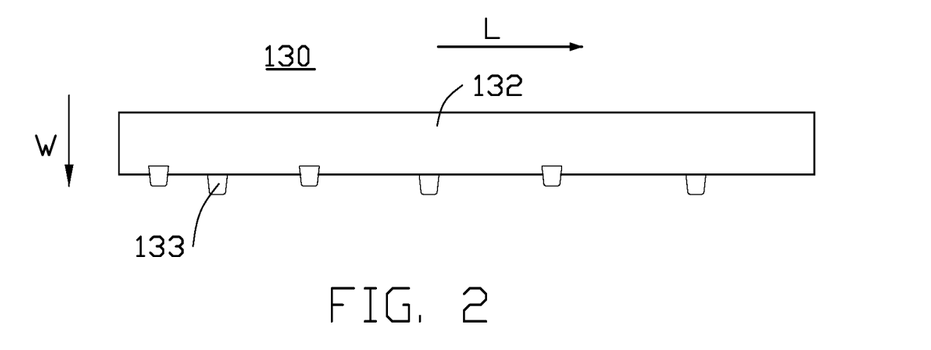
FIG. 2 is a top view of a first electrode plate, with an active material layer removed, of a battery cell of the electrochemical device of FIG. 1.

The composite current collector 131 includes a first metal layer 132, a second metal layer 135, and an insulation layer 136 sandwiched between the first metal layer 132 and the second metal layer 135. The first electrode tab 133 is disposed on an edge of the first metal layer 132 and extends beyond the insulation layer 136. The second electrode tab 134 is disposed on an edge of the second metal layer 135 and extends beyond the insulation layer 136. Referring to FIG. 2, in one embodiment, the first electrode tab 133 is disposed on the edge of the first metal layer 132 in a length direction L of the first electrode plate 130 and extends beyond the insulation layer 136 along a width direction W of the first electrode plate 130, the second electrode tab 134 is disposed on the edge of the second metal layer 135 in the length direction L of the first electrode plate 130 and extends beyond the insulation layer 136 along the width direction W of the first electrode plate 130. In the present disclosure, the length direction L of the first electrode plate 130 refers to an extending direction of the first electrode plate 130, that is along a winding direction of the battery cell 10, the width direction W of the first electrode plate 130 refers to an extending direction of the electrode tab, and is substantially perpendicular to the length direction L.

The first electrode tab 133 and the second electrode tab 134 are stacked to form a multi-tab structure 17, which is electrically connected to the adapter plate 30 to conduct between the first metal layer 132 and the second metal layer 135. Specifically, the battery cell 10 in FIG. 1 shows two layers of the first electrode plate 130 for illustration, the second electrode tab 134 on one layer of the first electrode plate 130 is bent towards the first electrode tab 133 on other layer of the first electrode plate 130 and stacked with such first electrode plate 130 to form the multi-tab structure 17.

The insulation layer 136 can be made of a material selected from a group consisting of poly (butylene terephthalate), poly (ethylene naphthalate) (PEN), poly-ether-ether-ketone, polyimide, polyamide, polyethylene glycol, polyamide imide, polycarbonate, cyclic polyolefin, polyphenylene sulfide, polyvinyl acetate, poly tetra fluoroethylene, polynaphthylmethylene, polyvinylidene difluoride, poly (naphthalenedicarboxylicacid), poly propylene carbonate, poly (vinylidene difluoride-co-hexafluoropropylene), poly (vinylidene difluoride-co-chlorotrifluoroethylene), polysiloxane, vinylon, polypropylene, polyethylene, polyvinyl chloride, polystyrene, poly (cyanoarylether), polyurethane, polyphenylene oxide, polyester, polysulfone, derivatives thereof, and any combination thereof.

Each of the first metal layer 132 and the second metal layer 135 can be formed by sputtering, vacuum vapor deposition, ion plating, or pulse laser deposition. Since only the insulation layer 136 needs to be cut, metal burrs are avoided, and the voltage drop per unit time (K value) is reduced, thus safety of the battery is improved. Each of the first metal layer 132 and the second metal layer 135 can be made of a material selected from a group consisting of Ni, Ti, Cu, Ag, Au, Pt, Fe, Co, Cr, W, Mo, Al, Mg, K, Na, Ca, Sr, Ba, Si, Ge, Sb, Pb, In, Zn, and any combination (alloy) thereof. Optionally, the first metal layer 132 and the second metal layer 135 can be made of different materials or a same material.

Each of the first electrode tab 133 and the second electrode tab 134 is a metal sheet, which can be made of a material selected from a group consisting of Ni, Ti, Cu, Ag, Au, Pt, Fe, Co, Cr, W, Mo, Al, Mg, K, Na, Ca, Sr, Ba, Si, Ge, Sb, Pb, In, Zn, and any combination (alloy) thereof.

In a thickness direction H of the battery cell 10, a projection of the first electrode tab 133 overlaps with a projection of the second electrode tab 134. In other words, in the thickness direction H of the battery cell 10, the first electrode tab 133 and the second electrode tab 134 are overlapped together, so connecting the first electrode tab 133 and the second electrode tab 134 is easier. The first electrode plate 130 can further includes a plurality of the first electrode tabs 133 and a plurality of the second electrode tabs 134 respectively arranged at intervals along the first electrode plate 130. A distance between adjacent two of the plurality of first electrode tabs 133 increases or decreases along the first electrode plate 130, and a distance between adjacent two of the plurality of second electrode tabs 134 correspondingly increase or decreases along the first electrode plate 130. In the thickness direction H of the battery cell 10, the first electrode tabs 133 and the second electrode tabs 134 are overlapped together, so connecting the first electrode tabs 133 and the second electrode tabs 134 is easier. In the present disclosure, the thickness direction H of the battery cell 10 refers to a stacking direction of a multi-layer structure formed by winding the electrode plates of the battery cell 10 or a stacking direction of stacking the electrode plates of the battery cell 10.

Optionally, the insulation layer 136 extends beyond the first metal layer 132 and the second metal layer 135 along the width direction W of the first electrode plate 130. The insulation layer 136 includes a coated area 1361 and a non-coated area 1363 connected to the coated area 1361. The coated area 1361 is configured to carry the first metal layer 132 and the second metal layer 135. The first electrode tab 133 and the second electrode tab 134 are respectively attached to surfaces of the first metal layer 132 and the second metal layer 135 away from the insulation layer 136, extend to cover the non-coated area 1363, and then extend beyond the insulation layer 136. Referring to FIG. 1 again, the first electrode plate 130 further includes a first active material layer 137. The first active material layer 137 is disposed on each of the first metal layer 132 and the second metal layer 135, and covers portions of the first electrode tab 133 and the second electrode tab 134 on the non-coated area 1363. In the width direction W of the first electrode plate 130, the coated area 1361, the first metal layer 132, the second metal layer 135, and the first active material layer 137 are aligned with each other.

In the thickness direction H of the battery cell 10, a thickness of an edge of the first electrode plate 130 on which the electrode tab is disposed is equal to a total thickness of the insulation layer 136, the first electrode tab 133, and the second electrode tab 134, which does not include thicknesses of the first metal layer 132 and the second metal layer 135, thereby reducing the thickness of the edge of the first electrode plate 130, reducing a space occupied by the battery cell 10 in the width direction W, and further improving energy density of the electrochemical device 100.

In this embodiment, the first electrode plate 130 is a cathode electrode plate, the second electrode plate 150 is an anode electrode plate. The second electrode plate 150 includes a current collector 151 and a second active material layer 153 coated on opposite surfaces of the current collector 151. The current collector 151 is a metal foil. In the width direction W of the first electrode plate 130, the current collector 151 is aligned with the second active material layer 153, and the second active material layer 153 exceeds the first active material layer 137. The battery cell 10 further includes an insulating sheet 170. The insulating sheet 170 is disposed on sides of the first electrode tab 133 and the second electrode tab 134 away from the insulation layer 136, covers portions of the first electrode tab 133 and the second electrode tab 134 on the non-coated area 1363, and is configured to insulate the first electrode tab 133 from the second electrode tab 134.

Figure 3:
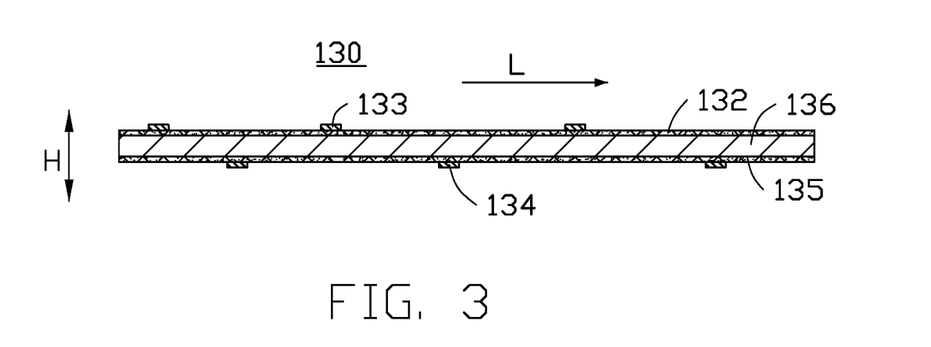
FIG. 3 is a side view of the first electrode plate of FIG. 2.
Figure 4:
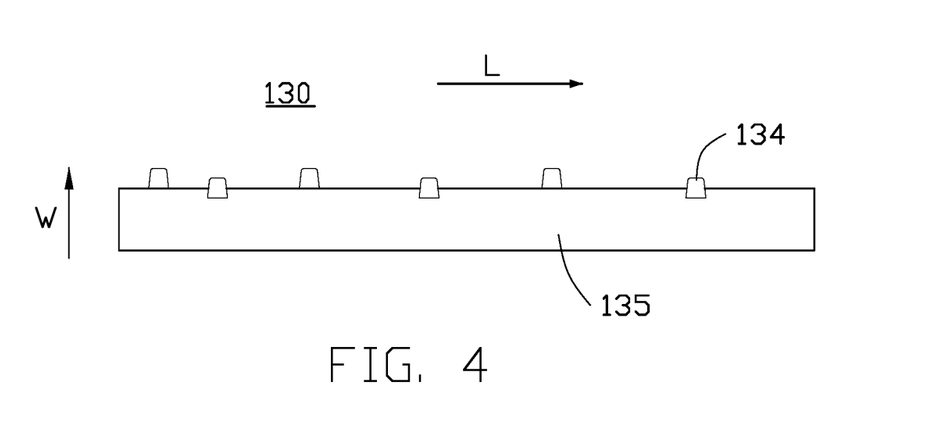
FIG. 4 is a bottom view of the first electrode plate of FIG. 2.

Referring to FIGS. 2-4, a plurality of the first electrode tabs 133 is disposed on the edge of the first metal layer 132, and arranged at intervals along the length direction L of the first electrode plate 130. A plurality of the second electrode tabs 134 is disposed on the edge of the second metal layer 135, and arranged at intervals along the length direction L of the first electrode plate 130.

In the length direction L of the first electrode plate 130, projections of the first electrode tabs 133 along a thickness direction H of the first electrode plate 130 and projections of the second electrode tabs 134 along the thickness direction H of the first electrode plate 130 are alternately arranged. In the present disclosure, the thickness direction H of the first electrode plate 130 refers to a stacking direction of a multi-layer structure of the first electrode plate 130. It is to be understood, the thickness H of the first electrode plate 130 is the same as the thickness H of the battery cell 10. A distance between adjacent two first electrode tabs 133 increases along the length direction L, and a distance between adjacent two second electrode tabs 134 correspondingly increases along the length direction L. After the first electrode plate 130 is wound to form the battery cell 10, the projection of the first electrode tab 133 in the thickness direction H overlaps with the projection of the second electrode tab 134 in the thickness direction H. In the drawings, the length direction L is labeled as extending from left hand side to right hand side, it is to understood that when the length direction L is labeled as extending from right hand side to left hand side, the distance between adjacent two first electrode tabs 133 decreases along the length direction L, and the distance between adjacent two second electrode tabs 134 decreases correspondingly along the length direction L.

Figure 5:
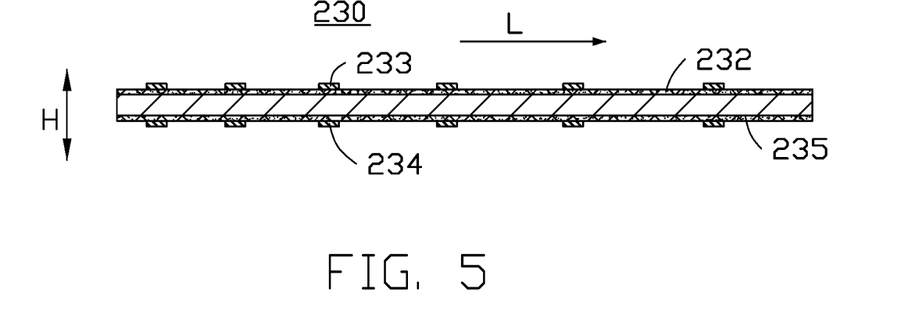
FIG. 5 is a side view of a second embodiment of an electrode plate according to the present disclosure.

FIG. 5 illustrates a second embodiment of an electrochemical device which is substantially the same as the electrochemical device 100 of the first embodiment except for the arrangement of a first electrode tab 233 and a second electrode tab 234 on a first electrode plate 230. Specifically, the first electrode tabs 233 are disposed on an edge of a first metal layer 232 and arranged at intervals along the length direction L, the second electrode tabs 234, corresponding to the first electrode tabs 233, are disposed on an edge of a second metal layer 235 and arranged at intervals along the length direction L. In the length direction L, a projection of each first electrode tab 233 along the thickness direction H overlaps with a projection of a corresponding second electrode tab 234 along the thickness direction H. A distance between adjacent two of the first electrode tabs 233 increases along the length direction L, and a distance between adjacent two of the second electrode tabs 234 increases correspondingly along the length direction L. Compared with the first embodiment, by adding the first electrode tab 233 and the second electrode tabs 234 in this second embodiment, the positions of the first electrode tabs 233 correspond to the positions of the second electrode tabs and 234 in the thickness direction H, thereby reducing an impedance of the electrochemical device.

Figure 6:
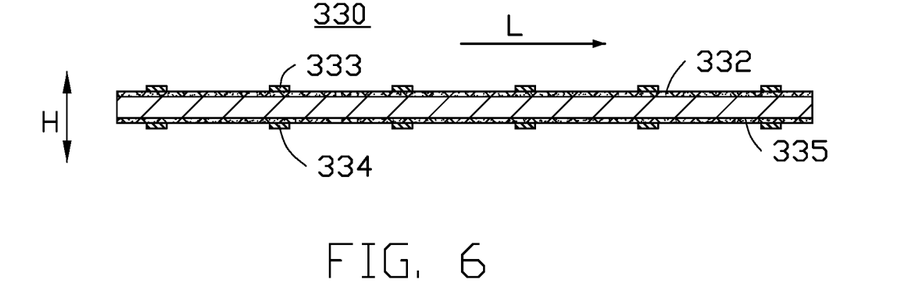
FIG. 6 is a side view of a third embodiment of an electrode plate according to the present disclosure.

FIG. 6 illustrates a third embodiment of an electrochemical device which is substantially the same as the electrochemical device of the second embodiment except for the arrangement of a first electrode tab 333 and a second electrode tab 334 on a first electrode plate 330. Specifically, a distance between adjacent two first electrode tabs 333 is equal, and a distance between adjacent two second electrode tabs 334 is equal. Compared with the second embodiment, the first electrode plate 330 is stacked to form a battery cell in this third embodiment.

Figure 7:
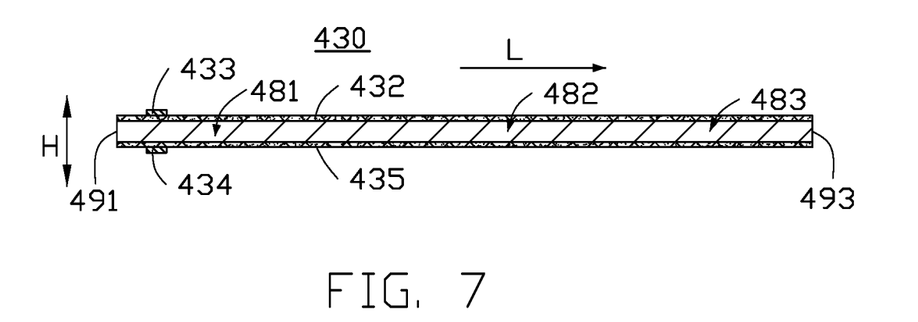
FIG. 7 is a side view of a fourth embodiment of an electrode plate according to the present disclosure.

FIG. 7 illustrates a fourth embodiment of an electrochemical device which is substantially the same as the electrochemical device 100 of the first embodiment except for the arrangement of a first electrode tab 433 and a second electrode tab 434 on a first electrode plate 430. Specifically, in the length direction L, the first electrode plate 430 includes a head portion 481, a middle portion 482, and a tail portion 483 connected in that order, the first electrode tab 433 is disposed on the head portion 481 of a first metal layer 432, the second electrode tab 434, corresponding to the first electrode tab 433, is disposed on the head portion 481 of a second metal layer 435. The first electrode plate 430 further includes a first end face 491 and a second end face 493 opposite to the first end face 491, the first end face 491 is a starting end of the first electrode plate 430 in the length direction L, the second end face 493 is a tail end of the first electrode plate 430 in the length direction L. In the present disclosure, the head portion 481 of the first electrode plate 430 is adjacent to the first end face 491, the tail portion 483 of the first electrode plate 430 is adjacent to the second end face 493, and the middle portion 482 of the first electrode plate 430 is adjacent to a center of the first electrode plate 430. For example, the first electrode plate 430 is evenly divided, from the first end face 491 to the second end face 493, into a first section, a second section, and a third section. The first section adjacent to the first end face 491 is the head portion 481, the third section adjacent to the second end face 493 is the tail portion 483, and the second section is the middle portion 482. Optionally, in the length direction L, a distance between the first electrode tab 433 and the first end face 491 is less than ⅓ of a length of the first electrode plate 430, and a distance between the second electrode tab 434 and the first end face 491 is less than ⅓ of a length of the first electrode plate 430. The first electrode plate 430 in this fourth embodiment can be stacked or wound to form a battery cell. The second electrode tab 434 can also be disposed on the middle portion 482 or the tail portion 483 of the second metal layer 435.

Figure 8:
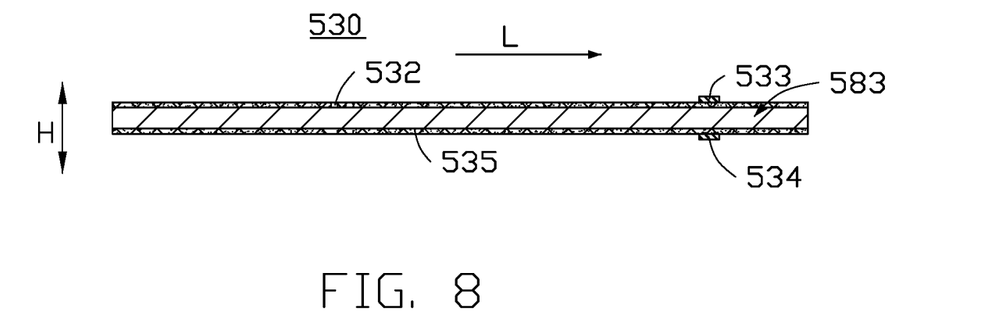
FIG. 8 is a side view of a fifth embodiment of an electrode plate according to the present disclosure.

FIG. 8 illustrates a fifth embodiment of an electrochemical device which is substantially the same as the electrochemical device of the fourth embodiment except for the arrangement of a first electrode tab 533 and a second electrode tab 534 on a first electrode plate 530. Specifically, the first electrode tab 533 is disposed on a tail portion 583 of a first metal layer 532, and the second electrode tab 534, corresponding to the first electrode tab 533, is disposed on the tail portion 583 of a second metal layer 535. Optionally, in the length direction L, a distance between each of the first electrode tab 533 and the second electrode tab 534 and the second end face 493 is less than ⅓ of a length of the first electrode plate 530. The second electrode tab 534 can also be disposed on the middle portion or the head portion of the second metal layer 535.

Figure 9:
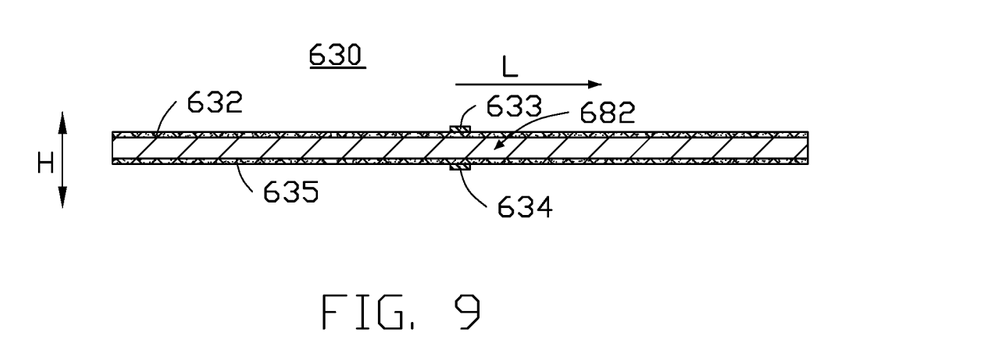
FIG. 9 is a side view of a sixth embodiment of an electrode plate according to the present disclosure.

FIG. 9 illustrates a sixth embodiment of an electrochemical device which is substantially the same as the electrochemical device of the fourth embodiment except for the arrangement of a first electrode tab 633 and a second electrode tab 634 on a first electrode plate 630. Specifically, the first electrode tab 633 is disposed on a middle portion 682 of a first metal layer 632, and the second electrode tab 634, corresponding to the first electrode tab 633, is disposed on the middle portion 682 of a second metal layer 635. The second electrode tab 634 can also be disposed on the head portion or the tail portion of the second metal layer 635.

Figure 10:
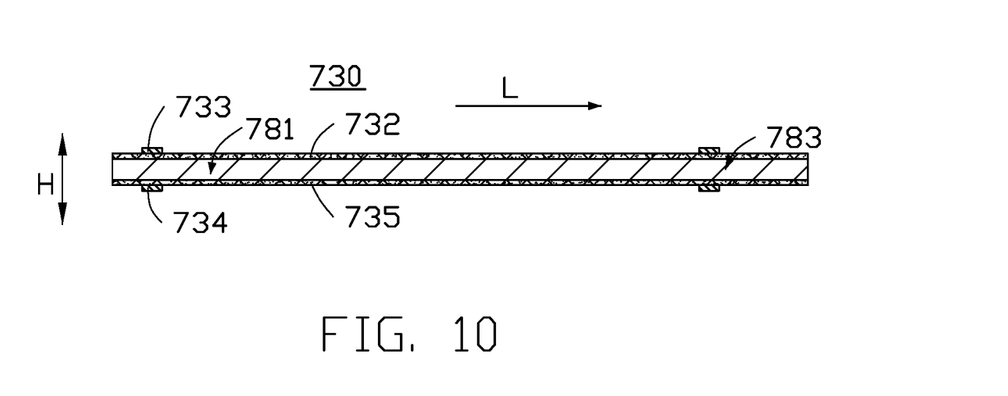
FIG. 10 is a side view of a seventh embodiment of an electrode plate according to the present disclosure.

FIG. 10 illustrates a seventh embodiment of an electrochemical device which is substantially the same as the electrochemical device of the fourth embodiment except for the arrangement of two first electrode tabs 733 and two second electrode tabs 734 on a first electrode plate 730. Specifically, the first electrode tabs 733 are disposed on a head portion 781 and a tail portion 783 of a first metal layer 732, and the second electrode tabs 734, corresponding to the first electrode tab 733, are disposed on the head portion 781 and the tail portion 783 of a second metal layer 735.

Figure 11:
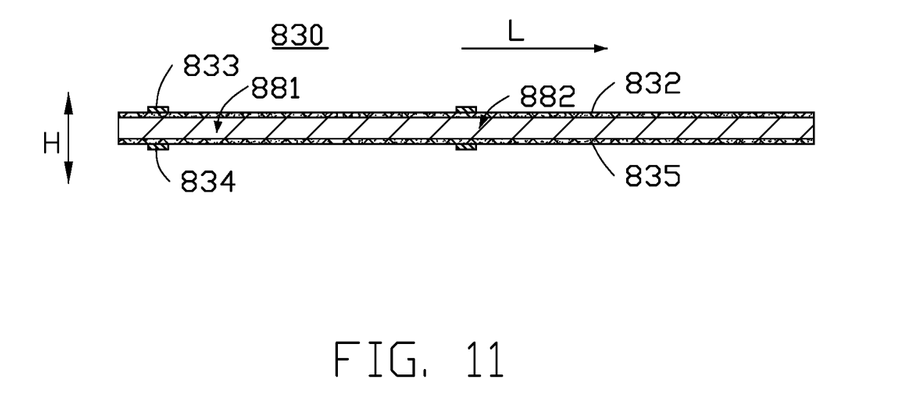
FIG. 11 is a side view of an eighth embodiment of an electrode plate according to the present disclosure.

FIG. 11 illustrates an eighth embodiment of an electrochemical device which is substantially the same as the electrochemical device of the fourth embodiment except for the arrangement of two first electrode tabs 833 and two second electrode tabs 834 on a first electrode plate 830. Specifically, the first electrode tabs 833 are disposed on a head portion 881 and a middle portion 882 of a first metal layer 832, and the second electrode tabs 834, corresponding to the first electrode tabs 833, are disposed on the head portion 881 and the middle portion 882 of a second metal layer 835.

Figure 12:
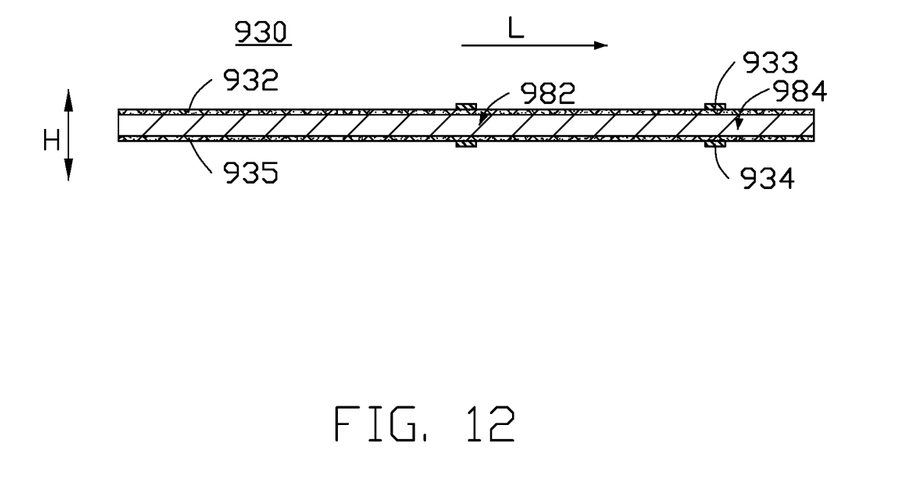
FIG. 12 is a side view of a ninth embodiment of an electrode plate according to the present disclosure.

FIG. 12 illustrates a ninth embodiment of an electrochemical device which is substantially the same as the electrochemical device of the fourth embodiment except for the arrangement of two first electrode tabs 933 and two second electrode tabs 934 on a first electrode plate 930. Specifically, the first electrode tabs 933 are disposed on a tail portion 984 and a middle portion 982 of a first metal layer 932, and the second electrode tabs 934, corresponding to the first electrode tabs 933, are disposed on the tail portion 983 and the middle portion 982 of a second metal layer 935.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure.

What is claimed is:

1. An electrode plate comprising:
   a composite current collector comprising a first metal layer, a second metal layer, and an insulation layer sandwiched between the first metal layer and the second metal layer;
   a plurality of first electrode tabs disposed on an edge of the first metal layer and extending beyond the insulation layer;
   a plurality of second electrode tabs disposed on an edge of the second metal layer and extending beyond the insulation layer, and the plurality of first electrode tabs and the plurality of second electrode tabs extending from a same side;
   wherein the first metal layer is disposed between the plurality of first electrode tabs and the insulation layer in a thickness direction of the electrode plate, and the second metal layer is disposed between the plurality of second electrode tabs and the insulation layer in the thickness direction of the electrode plate; and wherein the plurality of first electrode tabs and the plurality of second electrode tabs are disposed alternately in a length direction of the electrode plate, and at least one of the plurality of first electrode tabs is electrically connected to at least one of the plurality of second electrode tabs.

2. The electrode plate of claim 1, wherein the plurality of the first electrode tabs and the plurality of the second electrode tabs are respectively arranged at intervals in the length direction of the electrode plate.

3. The electrode plate of claim 1, wherein the electrode plate comprises a head portion, a middle portion, and a tail portion wherein the head portion, the middle portion, and the tail portion are connected in order in the length direction of the electrode plate, further comprising a first end face adjacent to the head portion and a second end face adjacent to the tail portion, wherein when the first electrode tab and the second electrode tab are both on the head portion of the electrode plate, in the length direction of the electrode plate, a distance between the first end face and each of the first electrode tab and the second electrode tab is less than $1/5$ of a length of the electrode plate, wherein when the first electrode tab and the second electrode tab are both on the tail portion of the electrode plate, in the length direction of the electrode plate, a distance between the second face and each of the second electrode tab and the second electrode tab is less than $1/5$ of a length of the electrode plate.

4. The electrode plate of claim 1, wherein the insulation layer extends beyond the first metal layer and the second metal layer in a width direction of the electrode plate, and the electrode plate further comprises an insulating sheet disposed on each of a side of the first electrode tab and a side of the second electrode tab away from the insulation layer.

5. A battery cell, comprising a first electrode plate according to claim 1, a second electrode plate, and a separator between the first electrode plate and the second electrode plate.

6. The battery cell of claim 5, wherein the electrode plate further comprises a plurality of the first electrode tabs and a plurality of the second electrode tabs respectively arranged at intervals along the electrode plate.

7. The battery cell of claim 6, wherein a distance between adjacent two of the plurality of first electrode tabs increases or decreases along the electrode plate, and a distance between adjacent two of the plurality of second electrode tabs correspondingly increase or decreases along the electrode plate.

8. The battery cell of claim 5, wherein in the length direction of the electrode plate, the electrode plate comprises a head portion, a middle portion, and tail portion connected in order, the first electrode tab is disposed on one of a head portion, a middle portion, and a tail portion of the first metal layer, and the second electrode tab is disposed on one of a head portion, a middle portion, and a tail portion of the second metal layer.

9. The battery cell of claim 8, wherein the electrode plate further comprises a first end face adjacent to the head portion and a second end face adjacent to the tail portion, wherein when the first electrode tab and the second electrode tab are both on the head portion of the electrode plate, in the length direction of the electrode plate, a distance between the first end face and each of the first electrode tab and the second electrode tab is less than $1/5$ of a length of the electrode plate, wherein when the first electrode tab and the second electrode tab are both on the tail portion of the electrode plate, in the length direction of the electrode plate, a distance between the second face and each of the second electrode tab and the second electrode tab is less than $1/5$ of a length of the electrode plate.

10. The battery cell of claim 5, wherein the insulation layer extends beyond the first metal layer and the second metal layer in a width direction of the electrode plate, and the electrode plate further comprises an insulating sheet disposed on each of a side of the first electrode tab and a side of the second electrode tab away from the insulation layer.

11. The battery cell of claim 5, wherein the first electrode tab is attached to a surface of the first metal layer, and the second electrode tab is attached to a surface of the second metal layer.

12. An electrochemical device, comprising an adapter plate and a battery cell comprising a first electrode plate according to claim 1, a second electrode plate, and a separator between the first electrode plate and the second electrode plate, wherein the first electrode tab and the second electrode tab are stacked to form a multi-tab structure, and the multi-tab structure is electrically connected to the adapter plate.

13. The electrode plate of claim 1, wherein the electrode plate further comprises an active material layer disposed on each of the first metal layer and the second metal layer, and covering a portion of the plurality of first electrode tabs on the first metal layer and a portion of the plurality of second electrode tabs on the second metal layer, such that the portion of the plurality of the first electrode tabs and the portion of the plurality of the second electrode tabs each extends into an interface between the active material layer and each of the first metal layer and the second metal layer.

* * * * *